(12) United States Patent
Chung et al.

(10) Patent No.: US 7,645,174 B2
(45) Date of Patent: Jan. 12, 2010

(54) MARINE PROPULSION SYSTEM AND METHOD OF OPERATING THE SAME

(75) Inventors: Kiyoung Chung, West Chester, OH (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 11/679,501

(22) Filed: Feb. 27, 2007

(65) Prior Publication Data
US 2008/0207066 A1    Aug. 28, 2008

(51) Int. Cl.
*B60L 11/00* (2006.01)
(52) U.S. Cl. ......................................................... 440/6
(58) Field of Classification Search .................. 440/6
See application file for complete search history.

(56) References Cited

U.S. PATENT DOCUMENTS

| | | | |
|---|---|---|---|
| 368,796 A * | 8/1887 | Trouvé | ........................... 440/6 |
| 4,114,555 A | 9/1978 | O'Brien, Jr. | |
| 4,220,111 A | 9/1980 | Krautkremer et al. | |
| 4,344,760 A | 8/1982 | Kulikowski | |
| 4,661,714 A | 4/1987 | Satterthwaite et al. | |
| 5,090,929 A | 2/1992 | Rieben | |
| 5,417,597 A | 5/1995 | Levedahl | |
| 6,066,012 A | 5/2000 | Nagle | |
| 6,188,139 B1 * | 2/2001 | Thaxton et al. | .............. 290/4 R |
| 6,234,853 B1 | 5/2001 | Lanyi et al. | |
| 6,240,867 B1 | 6/2001 | Hoyle et al. | |
| 6,361,387 B1 | 3/2002 | Clarkson | |
| 6,994,046 B2 | 2/2006 | Kaji et al. | |
| 7,131,385 B1 | 11/2006 | Ehlers et al. | |
| 7,150,662 B1 | 12/2006 | Janitz | |
| 2007/0184728 A1 * | 8/2007 | Kennedy | ......................... 440/3 |

FOREIGN PATENT DOCUMENTS

| WO | 02057132 A1 | 7/2002 |
|---|---|---|
| WO | 2004007278 A2 | 1/2004 |

OTHER PUBLICATIONS

EPO Search Report for EP08151878, dated Jun. 5, 2008, 7 pages.

* cited by examiner

*Primary Examiner*—Stephen Avila
(74) *Attorney, Agent, or Firm*—William Scott Andes, Esq.; Armstrong Teasdale LLP

(57) ABSTRACT

A propulsion system for a marine vessel includes a first electric machine coupled to a first drive shaft configured to provide propulsion to the marine vessel, and a second electric machine coupled to a second drive shaft configured to provide propulsion to the marine vessel, in a first mode of propulsion system operation, the first electric machine is configured as a generator to supply power to the second electric machine. The second electric machine is configured as a motor to drive the second drive shaft. A method of operating the propulsion system and a vessel including the propulsion system are also described.

18 Claims, 5 Drawing Sheets

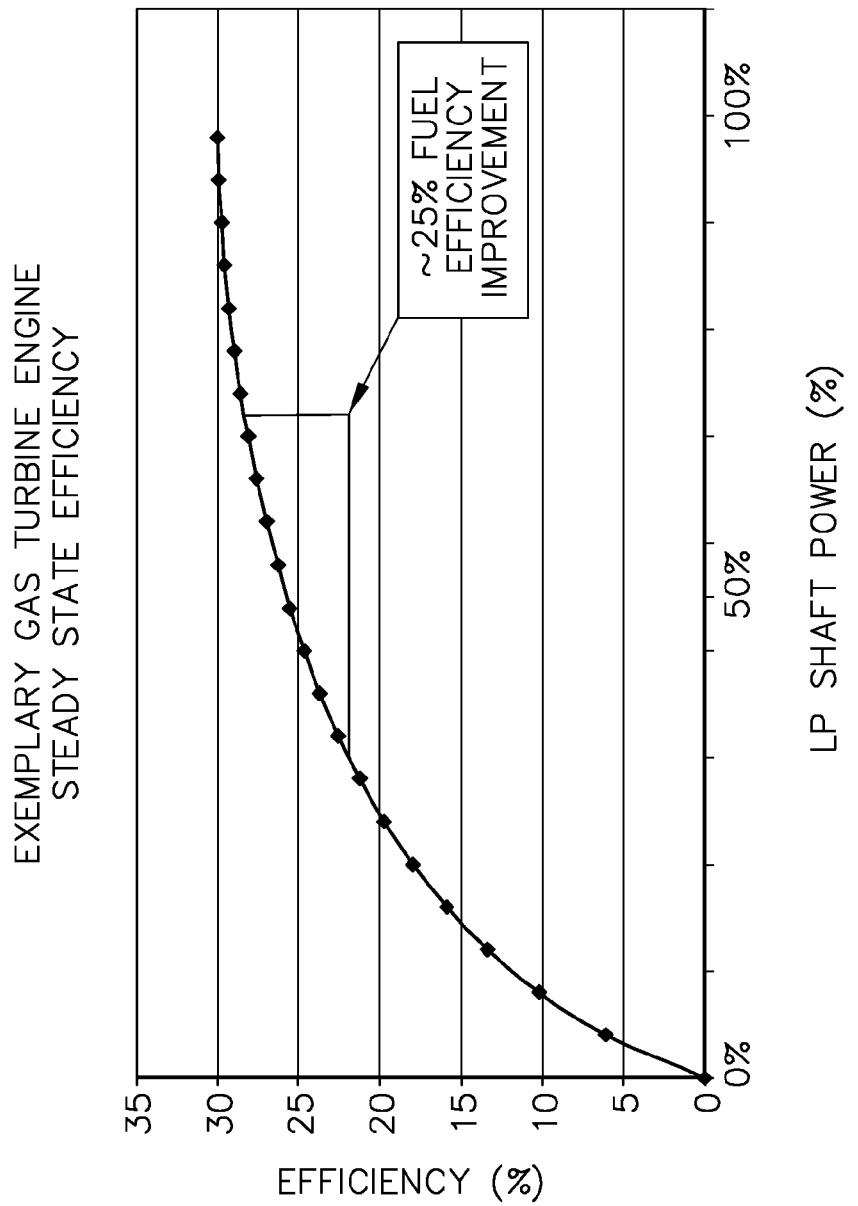

MARINE PROPULSION SYSTEM AND METHOD OF OPERATING THE SAME

BACKGROUND OF THE DISCLOSURE

The field of the disclosure relates generally to marine propulsion systems, and more particularly to, a marine propulsion system that includes two propulsion shafts and an electric machine coupled to each respective shaft and a method of operating the same.

At least one known marine propulsion system includes a plurality of gas turbine engines that are utilized to propel a marine vessel through the water. During operation, one or several gas turbine engines may be utilized to drive the vessel at the desired speed. For example, several gas turbine engines may be utilized to drive the vessel at a relatively high speed, with each gas turbine engine operating at peak fuel efficiency. Optionally, the operational speed of one or several of the gas turbine engines may be reduced to facilitate reducing the speed of the vessel.

While reducing the operating speed of the gas turbine engines is effective in reducing the operational speed of the vessel, gas turbine engines generally operate most effectively when the operational speed of the gas turbine engine is maintained near its rated load. As a result, varying the speed of a vessel by varying the speed of the gas turbine engine may result in the gas turbine engines operating at a reduced efficiency, thereby increasing fuel consumption, thus increasing the overall operating costs of the vessel.

BRIEF DESCRIPTION OF THE DISCLOSURE

In one aspect, a method of operating a marine propulsion system is provided. The marine propulsion system includes a first electric machine coupled to a first drive shaft configured to provide propulsion to a marine vessel and a second electric machine coupled to a second drive shaft configured to provide propulsion to the marine vessel. The propulsion system is capable of operating in a plurality of selectable modes of operation. The method includes operating the marine vessel in a first mode of propulsion system operation such that the mechanical output from the first electric machine drives the first drive shaft, and operating an electrical switching device in a second mode of propulsion system operation such that the electric output generated by the first electric machine is used to drive the second drive shaft.

In another aspect, a propulsion system for a marine vessel is provided. The propulsion system includes a first electric machine coupled to a first drive shaft configured to provide propulsion to the marine vessel, and a second electric machine coupled to a second drive shaft configured to provide propulsion to the marine vessel wherein in a first mode of propulsion system operation the first electric machine is configured as a generator to supply power to the second electric machine when the second machine is configured as a motor, the second electric machine drives the second drive shaft using the supplied power.

In a further aspect, a marine vessel including a propulsion system is provided. The propulsion system includes a first electric machine coupled to a first drive shaft configured to provide propulsion to the marine vessel, and a second electric machine coupled to a second drive shaft configured to provide propulsion to the marine vessel wherein the first electric machine is configured as a generator to supply power to the second electric machine, the second electric machine is configured as a motor to drive the second drive shaft.

BRIEF DESCRIPTION OF THE DRAWINGS

FIG. 5 is a graphical illustration of exemplary fuel savings achieved using embodiments of the propulsion system in accordance with embodiments of the present invention shown in FIGS. 2 and 3.

DETAILED DESCRIPTION OF THE DISCLOSURE

Figure 1:
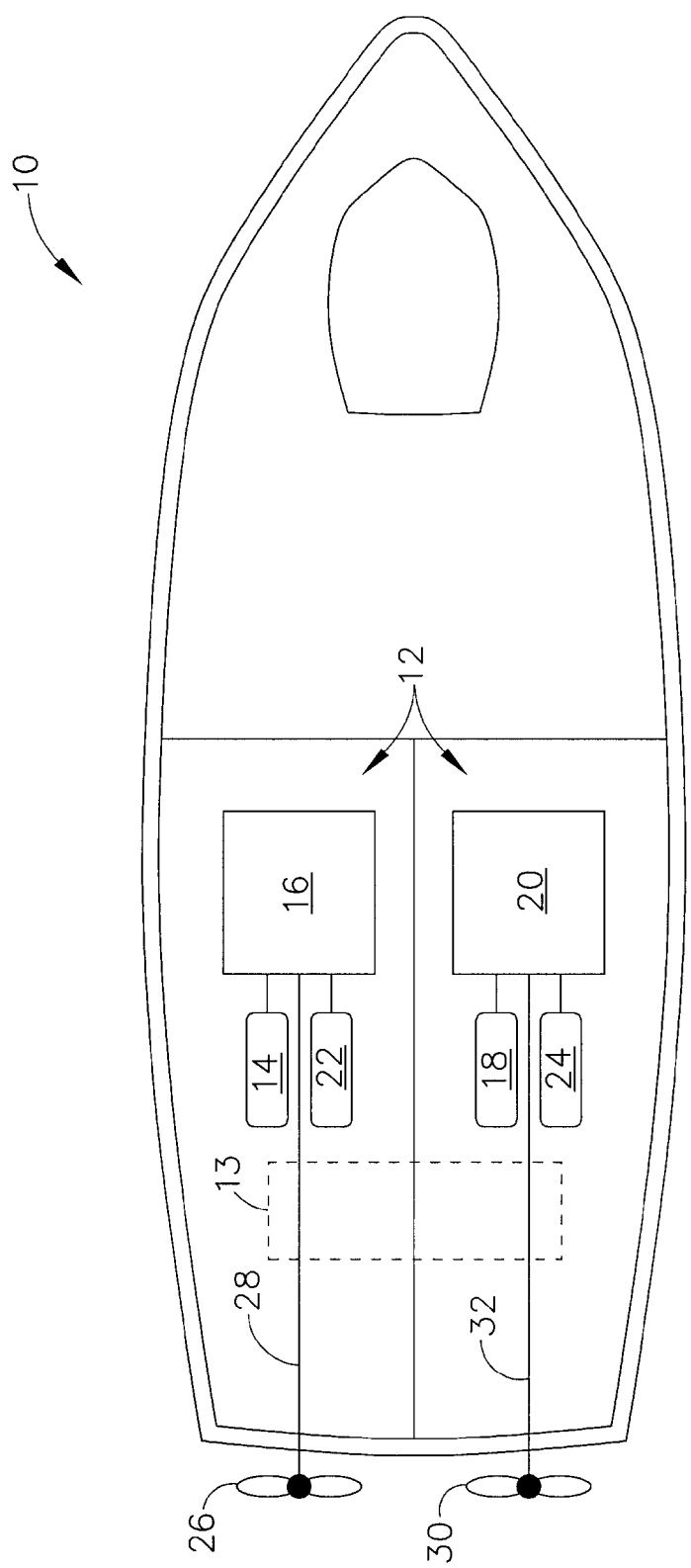
FIG. 1 is a simplified schematic illustration of a marine vessel that includes a propulsion system in accordance with an exemplary embodiment of the present invention.

FIG. 1 is a simplified schematic illustration of an exemplary marine vessel 10 that includes a propulsion system 12 including an electromagnetic cross-connect system 13 in accordance with embodiments of the present invention. Propulsion system 12 includes at least a first primer mover 14 that is coupled to a first gearbox 16, and a second prime mover 18 that is coupled to a second gearbox 20. As shown in FIG. 1, and in the exemplary embodiment, propulsion system 12 may also include a third prime mover 22 that is coupled to first gearbox 16, and a fourth prime mover 24 that is coupled to second gearbox 20. Propulsion system 12 also includes a first propeller 26 that is coupled to first gearbox 16 via a first drive shaft 28, and a second propeller 30 that is coupled to second gearbox 20 via a second drive shaft 32. In the exemplary embodiment, prime movers 14, 18, 22 and 24 are each gas turbine engines. Optionally, prime movers 14, 18, 22 and 24 may be diesel engines, electric motors, or nuclear power plants.

Moreover, although FIG. 1 illustrates that the exemplary propulsion system 12 includes two gearboxes 16, 20 and two prime movers 14, 22 and 18, 24, respectively, coupled to each respective gearbox 16, 20, it should be realized that in other embodiments propulsion system 12 may include a single prime mover coupled to each respective gearbox or more than two prime movers coupled to each respective gearbox. In the exemplary embodiment, each of gearboxes 16 and 20 is a double-input, double reduction, single-output, locked train gearbox. Optionally, if only a single prime mover is utilized to drive each respective gearbox, each of gearboxes 16 and 20 is single input gearbox.

Figure 2:
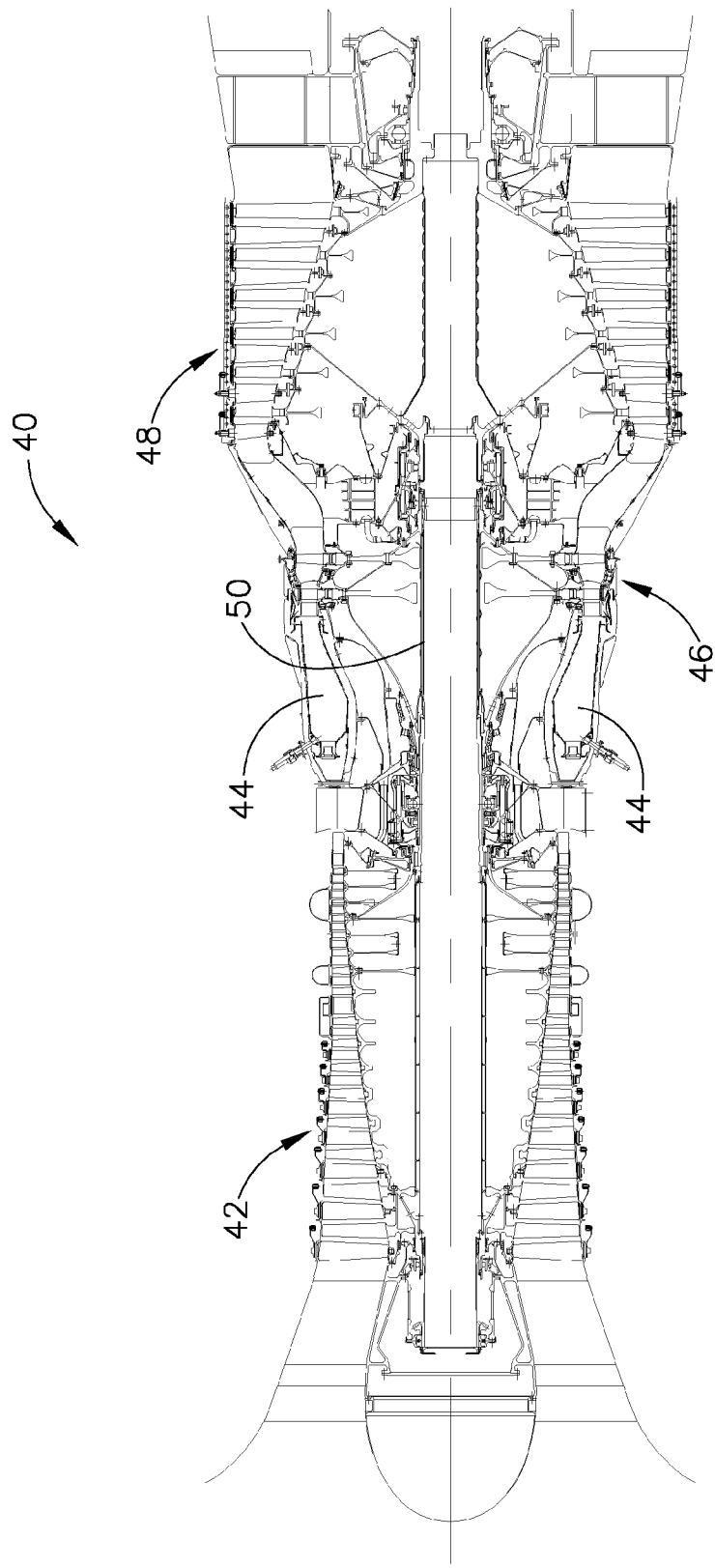
FIG. 2 is a simplified block diagram of an exemplary gas turbine engine that may be used as a prime mover in the propulsion system shown in FIG. 1.

FIG. 2 is a simplified block diagram of an exemplary gas turbine engine 40 that may be used as a prime mover, i.e. prime mover 14, 18, 22, and/or 24, with the propulsion system 12 shown in FIG. 1. Gas turbine engine 40 includes at least, a high-pressure compressor 42, a combustor 44 disposed downstream from the high-pressure compressor 42, and a high-pressure turbine 46 that is disposed downstream from the combustor 44. Gas turbine engine 40 also includes a low-pressure or power turbine 48 that is aerodynamically coupled to high-pressure turbine 46 and as disposed downstream from high-pressure turbine 46. High-pressure turbine 46 is coupled to high-pressure compressor 42 via a drive shaft 50. Gas turbine engine 40 may be used to drive a load, such as first gearbox 16 and/or second gearbox 20, for example.

In operation, ambient air, drawn into high-pressure compressor 42 is compressed and channeled downstream to combustor 44 wherein the compressed air is mixed with fuel, and the mixture is ignited to generate high temperature combustion gases. The combustion gases are channeled from combustor 44 to drive turbines 46 and 48 and then channeled through an exhaust duct to ambient.

Figure 3:
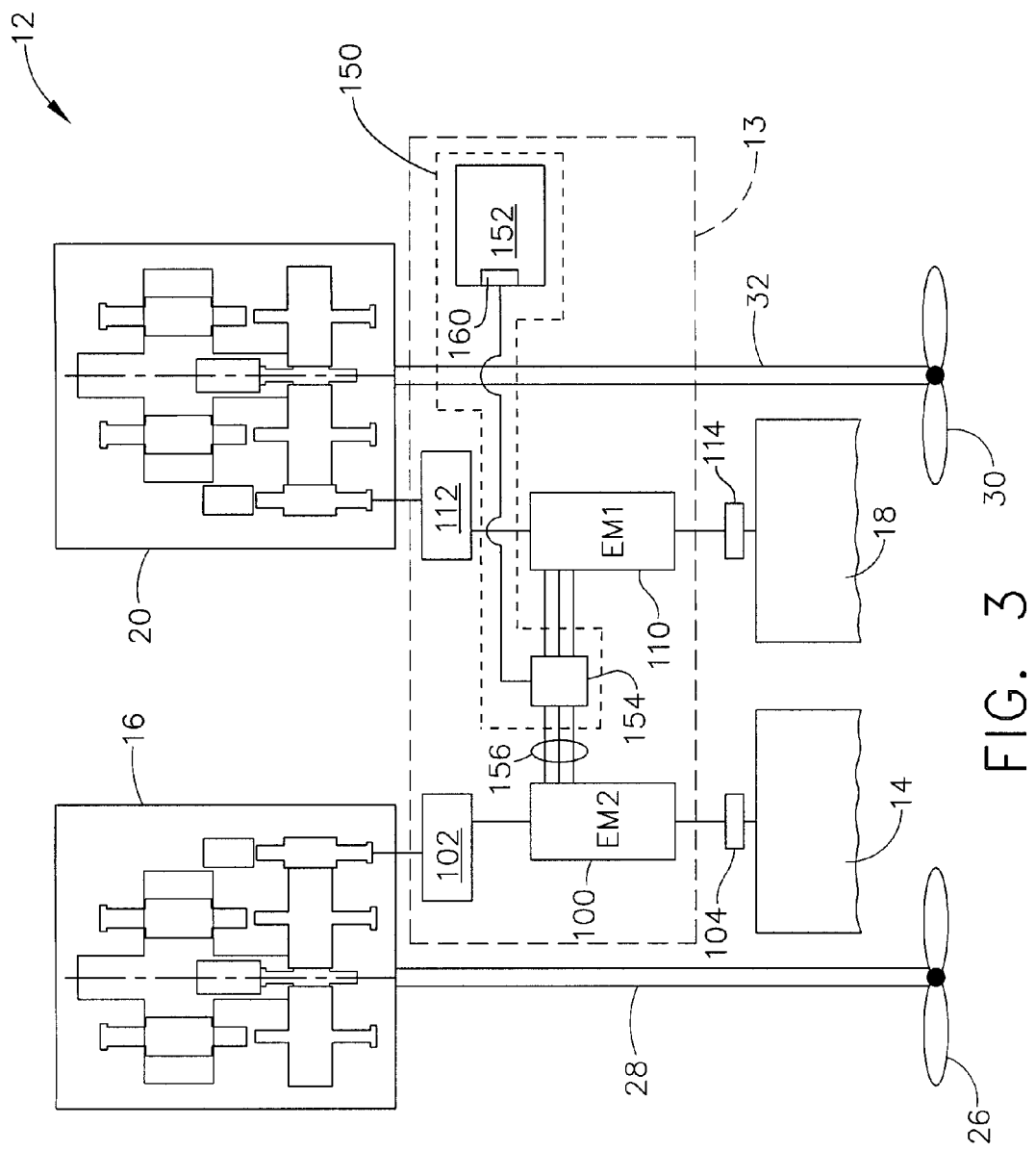
FIG. 3 is a schematic view of a portion of the exemplary propulsion system shown in FIG. 1 including an exemplary electromagnetic cross connect system.
Figure 4:
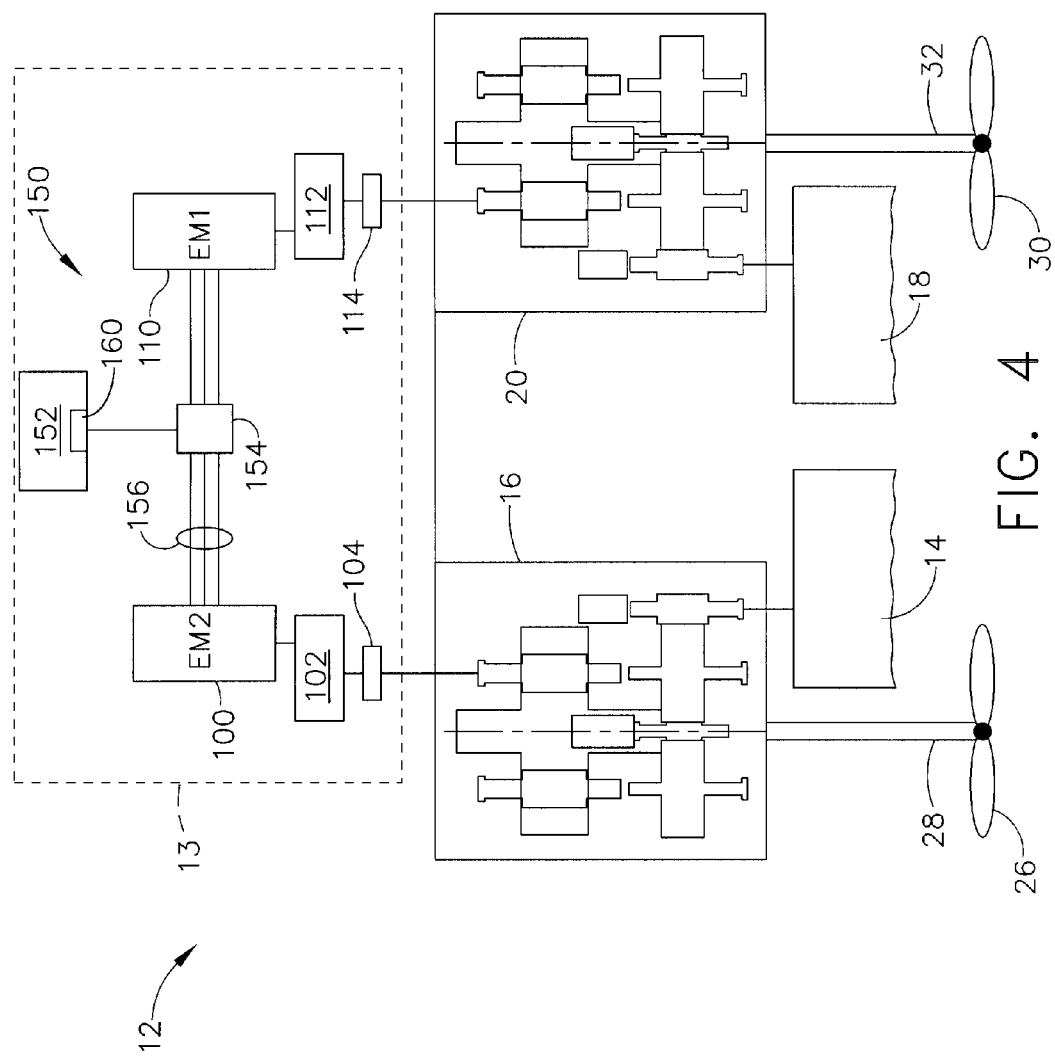
FIG. 4 is a schematic view of a portion of the exemplary propulsion system shown in FIG. 1 including another exemplary electromagnetic cross connect system.

FIG. 3 is a schematic view of a portion of propulsion system 12 shown in FIG. 1 in accordance with an embodiment of the present invention. FIG. 4 is a schematic view of a portion of propulsion system 12 shown in FIG. 1 in accordance with another embodiment of the present invention. In the exemplary embodiment shown in FIG. 3, electromagnetic cross-connected system 13 includes a first electric machine 100 that is coupled between an output of first prime mover 14 and first gearbox 16. More specifically, system 13 also includes a third reduction gearbox 102 that is coupled between first electric machine 100 and first gearbox 16.

As shown in FIG. 3, first prime mover 14 is coupled in series with first electric machine 100 which is coupled in series with third gearbox 102, and gearbox 16 is coupled in series with third gearbox 102. In the exemplary embodiment, propulsion system 12 includes a first clutch assembly 104 that is coupled between first prime mover 14 and first electric machine 100 to facilitate coupling or decoupling first prime mover 14 from first electric machine 100 during selected operational conditions which are discussed below. Optionally, as shown in FIG. 4, first prime mover 14 is coupled to first gearbox 16. Moreover, first electric machine 100 is coupled in series with third gearbox 102 to first gearbox 16. In the exemplary embodiment, system 13 includes first clutch assembly 104 that is coupled between third gearbox 102 and first gearbox 16.

As shown in FIG. 3, an embodiment of electromagnetic cross-connect system 13 also includes at least a second electric machine 110 that is coupled between second prime mover 18 and second gearbox 20. Moreover, propulsion system 12 also includes a fourth reduction gearbox 112 that is coupled between second electric machine 110 and second gearbox 20. As shown in FIG. 3, second prime mover 18 is coupled in series with second electric machine 110 which is coupled in series with fourth reduction gearbox 112, and gearbox 20 is coupled in series with fourth gearbox 112. In the exemplary embodiment, propulsion system 12 also includes a second clutch assembly 114 that is coupled between second prime mover 18 and second electric machine 110 to facilitate coupling or decoupling second prime mover 18 from second electric machine 110 during selected operational conditions which are discussed below. Optionally, as shown in FIG. 4, second prime mover 18 is coupled to second gearbox 20. Moreover, second electric machine 110 is coupled in series with fourth gearbox 112 to second gearbox 20. In the exemplary embodiment, system 13 includes a second clutch assembly 114 that is coupled between fourth gearbox 112 and second gearbox 18.

Gearboxes 16, 20, 102, and 112 each have a predetermined gear ratio that is selected based on the operating range of propulsion shafts 28, 32, and the operating speeds of the prime movers. In the exemplary embodiment, the gear ratios are selected such that the prime movers may be operated at an operational range between 0 revolutions per minute (rpm) and approximately 10,000 RPM and drive shafts 28, 32 at an operational speed that is between 0 RPM and approximately 200 RPM.

In the exemplary embodiment, each of electric machines 100 and 110 is a synchronous, three-phase, wound rotor that is configured to operate at a variable electrical frequency based on the rotational speed of the respective prime mover. Optionally, each electric machine 100 or 110 is any type of motor/generator including, but not limited to, a permanent magnet generator, salient pole generators, double-sided stator generators, and/or a doubly-fed induction generator with any number of phases and rated for any power, voltage and rotation values that facilitate operation of system 13 as defined herein.

During operation of system 13 shown in FIG. 3, because each electric machine is directly coupled to a respective one of prime movers 14, 18, when prime mover 14, 18 is operating at a selected speed, such as 5000 revolutions per minute (RPM) for example, electric machine 100, 110 respectively will rotate at 5,000 RPMs. As such, the electrical power frequency of electric machine 110, 110 is variable based on the speed of prime mover 14, 18 in accordance with the following equation:

$$f = \frac{\text{poles}}{2} \times \frac{1}{60} \times \text{speed of prime mover in RPM};$$

For example, if electric machine 100, 110 includes two poles, and prime mover 14, 18 is rotating at 5000 RPM, the frequency output of electric machine 100, 110 is approximately 83.3 Hz.

Optionally, during operation of electromagnetic cross-connect system 13 as shown in FIG. 4, the frequency of electrical machine 100, 110 is determined based on the rotational speed of respective prime mover 14, 18 divided by the gear ratios of the respective gears. For example, when prime mover 14, 18 is operating at a selected speed, such as 5000 revolutions per minute (RPM) for example, and the combined gear ratios of gear boxes 16 and 102 and gearboxes 20 and 112 is 1:2, electric machine 100, 110 rotates at approximately 10,000 RPM, generating a frequency of $$f = \frac{\text{poles}}{2} \times \frac{1}{60} \times 10{,}000 \text{ RPM}; \text{ or } 167 \text{ Hz}$$

Referring still to FIGS. 3 and 4, electromagnetic cross-connect system 13 also includes an electrical control and distribution system 150 that includes a control panel 152 that is coupled to an electrical switching device 154. Electrical switching device 154 is configured to enable electrical power to be conducted, via a bus 156, between first and second electrical machines 100 and 110 during selected operational conditions. Specifically, based on an input received from control panel 152, switching device 154 enables electrical power to be conducted from first electric machine 100 to second electric machine 110, or alternatively, enables electrical power to be conducted from second electric machine 110 to first electric machine 100. In the exemplary embodiment, the electrical switching device is a breaker that enables the first and second electrical machines 100, 110 to be electrically connected or disconnected utilizing a minimum of power electronics, and minimum losses.

During selected operating conditions, first electric machine 100 and second electric machine 110 are utilized in combination to drive propulsion shafts 28 and 32. More specifically, as discussed above, when a reduced vessel speed is desired, an operator may desire to deactivate the prime mover(s) 14, 22, 18, 24 driving either first shaft 28 or second shaft 32.

Referring to FIGS. 1, 3, and 4, for example, in a first selectable operating condition or mode of operation, referred to herein as a "full power mode" drive shaft 28 is driven by two prime movers 14, 22 and drive shaft 32 is driven by two additional prime movers 18, 24. Thus, in the full power mode, a first prime mover 14 and third prime mover 22 are each activated to drive first drive shaft 28 via first electric machine 100, third gearbox 102, and first gearbox 16. Additionally, second prime mover 18 and fourth prime mover 24 are each activated to drive second drive shaft 32 via second electric machine 110, fourth gearbox 112, and second gearbox 20. In the full power mode of operation, electrical switching device 154 is placed in an open position. That is, electrical switching device 154 does not allow power to be conducted between first and second electric machines 100 and 110.

In a second selectable operating condition or mode of operation, referred to herein as a "split plant mode" each drive shaft 28 and 32 is driven by a single respective prime mover. For example, in the split plant mode first prime mover 14 is activated to drive first drive shaft 28 via first electric machine 100, third gearbox 102, and first gearbox 16. Additionally, second prime mover 18 is activated to drive second drive shaft 32 via second electric machine 110, fourth gearbox 112, and second gearbox 20. In the split plant mode of operation, electrical switching device 154 is placed in an open position. That is, electrical switching device 154 does not allow power to be conducted between first and second electric machines 100 and 110.

In a third mode of operation, referred to herein is a "trail shaft mode" only a single drive shaft 28 or 32 is driven by a respective prime mover 14 or 18. For example, in the trail shaft mode, first prime mover 14 may be activated to drive first drive shaft 28 via first electric machine 100, third gearbox 102, and first gearbox 16. Optionally, second prime mover 18 may be activated to drive second drive shaft 32 via second electric machine 110, fourth gearbox 112, and second gearbox 20. In the trail shaft mode of operation, electrical switching device 154 is placed in an open position. That is, electrical switching device 154 does not allow power to be transmitted between first and second electric machines 100 and 110. In this mode of operation, only shaft 28 or 32 is used to drive vessel 10 and remaining shaft 28 or 32 trails. That is, remaining shaft 28 or 32 is not used to drive vessel 10. As a result, to vary the speed of vessel 10, the rotational speed of prime mover 14 or 18 is either increased or decreased based on the desired vessel speed.

However, in a fourth mode of operation, referred to herein as an "electromagnetically cross-connected mode" only a single prime mover 14 or 18 is configured to drive both propulsion shafts 28 and 32. For example, in the electromagnetically cross-connected mode, first prime mover 14 is configured to drive both first drive shaft 28 and second drive shaft 32. Optionally, second prime mover 18 is configured to drive both first drive shaft 28 and second drive shaft 32.

Moreover, in the electromagnetically cross-connected mode of operation, electrical switching device 154 is placed in a closed position, that is electrical switching device 154 enables power to be transmitted between the first and second electric machines 100 and 110. In this mode of operation, only a single prime mover is used to drive vessel 10 using both shafts 28 and 32.

To align propulsion system 12 into the electromagnetically cross-connected mode, the speed and phase of first electric machine 100 must be approximately equal to the speed and phase of second electric machine 110 prior to closing electrical switching device 154. For example, to align propulsion system 12 such that first primer mover 14 is driving both the first and second shafts 28 and 32, the speed and phase of second electric machine 110 is adjusted to approximately match the speed and phase of first electric machine 100.

Referring to FIGS. 3 and 4 and in the exemplary embodiment, electromagnetic cross-connected system 13 includes a synchroscope 160 that facilitates placing first electric machine 100 in parallel with second electric machine 110. Synchroscope 160 indicates whether second electric machine 110 is operating faster, slower or in phase with bus 156. When electromagnetic cross-connected system 13 determines that second electric machine 110 is in phase with bus 156 and thus also in phase with first electric machine 100, electrical switching device 154 is then closed. In one embodiment, control system 152 automatically determines when second electric machine 110 is in phase with first electric machine 100 and transmits a signal to close electrical switching device 154. Optionally, electrical switching device 154 is closed manually by an operator.

Once electrical switching device 154 is closed, first electric machine 100 and second electric machine 110 are electrically coupled together, second electric machine 110 accepts the load, i.e. second electric machine 110 is enabled to drive second shaft 32. Second prime mover 18 may then be declutched or deactivated such that first prime mover 14 is driving both first and second shafts 28 and 32. Because first prime mover 100 is driving first shaft 28, and as a result also driving first electric machine 100, the first electric machine 100 will function as a generator to produce electrical power. The electrical power generated by first electric machine 100 is then conducted to second electric machine 110 via electrical switching device 154.

In the electromagnetically cross-connected mode, second electric machine 110 functions as a motor that receives electrical power from first electric machine 100 that is now functioning as a generator. Moreover, as discussed above, first electric machine 100 generates power having a frequency that is related to the operating speed of first prime mover 14. As such, when the electrical power is conducted from first electric machine 100 to second electric machine 110, second electric machine 110 will rotate at approximately the same speed as first electric machine 100. Moreover, since second electric machine 110 is directly coupled to second shaft 32 via gearboxes 112 and 20, second shaft 32 will rotate at a rotational speed that is approximately the same as the rotational speed of first shaft 28.

Adjusting the speed of first shaft 28 by either increasing or decreasing the operating speed of first prime mover 14, causes the frequency output of first electric machine 100 to change, further causing the speed of second electric machine 110 to change, resulting in the speed of second shaft 32 changing. As a result, in the electromagnetically connected cross-connected mode, a single prime mover 14 or 18 is configured to drive two shafts 28 and 32 to propel vessel 10. Moreover, since marine vessel 10 includes the exemplary propulsion system described herein, both shafts 28 and 32 will operate at substantially the same speed while also reducing fuel consumption.

Described herein is an exemplary propulsion system that includes two propulsion shafts and an electric machine coupled to each respective shaft. The exemplary propulsion system is configured to operate at least one of the electric machines as a generator driven by a first propulsion shaft. The generator delivers power to a second electric machine operating as a motor to drive the second shaft. In this arrangement, a single prime mover may be utilized to drive both propulsion shafts at approximately the same rotational speed to improve fuel efficiency as shown in FIG. 5.

More specifically, the exemplary propulsion system described herein includes a gas turbine engine configured to drive a propeller shaft through a gearbox. A first electric machine is connected between the gas turbine engine and the gearbox. During operation the first electric machine produces power at a frequency proportional to the gas turbine's speed. Moreover, the first electric machine is operated as a generator to supply power to a second electric machine coupled in the same configuration on the second shaft-gearbox system. The second electric machine is operated as a motor and its speed is proportional to the input frequency from the first electric machine. As such, two propeller shafts are powered at the same speed with no power conversion equipment required, such as transformers or power electronics, for example, to be coupled between the two electric machines. This arrangement allows the vessel to be operated with improved fuel efficiency for conditions where one prime mover has sufficient power to drive multiple propellers.

Also, described herein is a method for operating an exemplary marine propulsion system that includes a first electric machine coupled to a first drive shaft utilized to provide propulsion to the marine vessel and a second electric machine coupled to a second drive shaft utilized to provide propulsion to the marine vessel. The method includes operating the marine vessel such that the mechanical output from the first electric machine drives the first drive shaft, and operating an electrical switching device such that the electric output generated by the first electric machine is used to drive the second drive shaft.

While the disclosure has been described in terms of various specific embodiments, it will be recognized that the disclosure can be practiced with modification within the spirit and scope of the claims.

What is claimed is:

1. A method for operating a marine propulsion system that includes a first electric machine coupled to a first prime mover through a first drive shaft configured to provide propulsion to a marine vessel and a second electric machine coupled to a second prime mover through a second drive shaft configured to provide propulsion to the marine vessel, said propulsion system capable of operating in a plurality of selectable modes of operation, said method comprising:
   operating the marine vessel in a first mode of propulsion system operation such that the mechanical output from the first electric machine drives the first drive shaft; and
   operating an electrical switching device configured to electrically couple said first and second machines in a second mode of propulsion system operation such that the electric output generated by the first electric machine is supplied through an electrical bus coupled between the first and second electric machines to drive the second electric machine which drives the second drive shaft when the second prime mover is deactivated.

2. A method in accordance with claim 1, wherein operating an electrical switching device such that the electric output generated by the first electric machine is used to drive the second electric machine comprises:
   transmitting power generated by the first electric machine to the second electric machine.

3. A method in accordance with claim 2, further comprising activating the first prime mover to drive the first electric machine and the second electric machine during a selected modes of operation of the propulsion system.

4. A method in accordance with claim 3, further comprising deactivating the second prime mover when the electric output generated by the first electric machine is used to drive the second drive shaft.

5. A propulsion system for a marine vessel, said propulsion system comprising:
   a first electric machine coupled to a first prime mover through a first drive shaft utilized to provide propulsion to the marine vessel;
   a second electric machine coupled to a second drive shaft utilized to provide propulsion to the marine vessel;
   an electrical bus coupled between said first and second electric machines; and
   an electrical switching device configured to electrically couple said first and second machines through said electrical bus, said electrical switching device is configured to conduct electrical power generated by said first electric machine to said second electric machine during the first selected mode of operation of the propulsion system when a second prime mover coupled to said second machine is deactivated,
   wherein in a first mode of propulsion system operation said first electric machine is configured as a generator to supply power to said second electric machine when said second machine is configured as a motor, said second electric machine drives said second drive shaft using the supplied power.

6. A propulsion system in accordance with claim 5, wherein said first prime mover is configured to drive said first electric machine and said second electric machine during the first modes of operation of the propulsion system.

7. A propulsion system in accordance with claim 6, wherein said second prime mover is coupled to said second electric machine and configured to drive said second electric machine during a second selected modes of operation of the propulsion system.

8. A propulsion system in accordance with claim 7, wherein said first and second prime movers each comprise a gas turbine engine.

9. A propulsion system in accordance with claim 5, wherein said first prime mover is configured to drive said first electric machine such that said first electric machine generates power a first frequency, said electrical switching device is configured to conduct electrical power generated by said first electric machine at the first frequency to said second electric machine such that said second electrical device operates at the first frequency.

10. A propulsion system in accordance with claim 5, wherein said first prime mover is configured to drive said first drive shaft at a first speed and said second electric machine drives said second drive shaft at a second speed wherein the second speed is one of less than, equal to, or greater than the first speed.

11. A propulsion system in accordance with claim 5, further comprising:
   a first gearbox coupled between said first electric machine and said first drive shaft; and
   a second gearbox coupled between said second electric machine and said second drive shaft.

12. A propulsion system in accordance with claim 11, further comprising:
   a third gearbox coupled between said first electric machine and said first gearbox; and
   a fourth gearbox coupled between said second electric machine and said second gearbox.

13. A propulsion system in accordance with claim 12, further comprising:
   a first clutch coupled between said first prime mover and said first electric machine; and
   a second clutch coupled between said second prime mover and said second electric machine.

14. A marine vessel including a propulsion system including
- a first electric machine coupled to a first prime mover through a first drive shaft configured to provide propulsion to the marine vessel;
- a second electric machine coupled to a second prime mover through a second drive shaft configured to provide propulsion to the marine vessel wherein said first electric machine is configured as a generator to supply electric power to said second electric machine, said second electric machine is configured as a motor to drive said second drive shaft when said second prime mover is deactivated;
- an electrical bus coupled between said first and second electric machines; and
- an electrical switching device configured to electrically couple said first and second machines through said electrical bus, said electrical switching device is configured to conduct electrical power generated by said first electric machine to said second electric machine when said second prime mover is deactivated.

15. A marine vessel in accordance with claim 14, wherein said first prime mover is configured to drive said first electric machine and said second electric machine during a first selected mode of operation of the propulsion system.

16. A marine vessel in accordance with claim 15, wherein said second prime mover is configured to drive said second electric machine and said first electric machine during a second selected mode of operation of the propulsion system.

17. A propulsion system in accordance with claim 16, wherein said first and second prime movers each comprise a gas turbine engine.

18. A marine vessel in accordance with claim 14, further comprising:
- an electrical bus coupled between said first and second electric machines; and
- an electrical switching device, said electrical switching device is configured to transmit electrical power generated by said first electric machine to said second electric machine during selected operations.

* * * * *